(12) United States Patent
Kucera et al.

(10) Patent No.: US 6,521,687 B2
(45) Date of Patent: *Feb. 18, 2003

(54) AUTODEPOSITABLE ADHESIVE

(75) Inventors: Helmut W. Kucera, West Springfield, PA (US); Douglas H. Mowrey, Titusville, PA (US); Rebecca S. Cowles, Wattsburg, PA (US)

(73) Assignee: Lord Corporation, Cary, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/488,716

(22) Filed: Jan. 20, 2000

(65) Prior Publication Data

US 2003/0008960 A1 Jan. 9, 2003

Related U.S. Application Data

(60) Provisional application No. 60/116,767, filed on Jan. 22, 1999.

(51) Int. Cl.$^7$ ................................................. G08K 3/32
(52) U.S. Cl. ....................... 524/417; 524/414; 428/461; 428/462; 428/463
(58) Field of Search ................................. 524/414, 417; 428/461, 462, 463

(56) References Cited

U.S. PATENT DOCUMENTS

| | | | | |
|---|---|---|---|---|
| 4,647,480 A | * | 3/1987 | Ahmed | 427/341 |
| 4,923,921 A | * | 5/1990 | Chevalier | 524/555 |
| 5,200,455 A | | 4/1993 | Warren | |
| 5,372,853 A | * | 12/1994 | Roberto | 427/337 |
| 5,385,979 A | | 1/1995 | Ozawa et al. | |
| 5,427,863 A | * | 6/1995 | Siebert | 428/463 |
| 5,646,211 A | * | 7/1997 | Honda | 524/406 |
| 5,717,031 A | * | 2/1998 | Degen | 525/129 |
| 5,760,112 A | * | 6/1998 | Hirota | 524/157 |
| 5,837,089 A | * | 11/1998 | Magrum | 156/275.5 |
| 5,912,297 A | * | 6/1999 | Hall | 524/547 |
| 5,962,576 A | * | 10/1999 | Dehnicke | 524/510 |
| 6,379,752 B1 | | 4/2002 | Schelbah et al. | |

FOREIGN PATENT DOCUMENTS

| | | |
|---|---|---|
| DE | 197 55 421 | 6/1999 |
| WO | WO 99 02583 A | 1/1999 |
| WO | WO 99 37713 A | 7/1999 |

* cited by examiner

Primary Examiner—Edward J. Cain
(74) Attorney, Agent, or Firm—Miles B. Dearth

(57) ABSTRACT

A method for bonding two substrates that includes applying an autodepositable adhesive to one of the substrates and then bonding the substrates together. This method is especially useful for bonding elastomers to metals. According to a first embodiment, the autodepositable adhesive is a one coat adhesive having a low pH (approximately 1–3) and including (A) a flexibilizer or film-former, (B) optionally, an aqueous dispersion of a phenolic resin that includes water and a reaction product of a phenolic resin precursor, a modifying agent and, optionally, a multi-hydroxy phenolic compound wherein the modifying agent includes at least one functional moiety that enables the modifying agent to react with the phenolic resin precursor and at least one ionic moiety, and (C) an acid. According to a second embodiment, the autodepositable adhesive is a covercoat adhesive that includes a flexibilizer or film-former that is a latex that coagulates when exposed to metallic ions generated from the metallic substrate upon which the covercoat is applied. The covercoat preferably also includes a crosslinker as described above in connection with the one coat embodiment.

21 Claims, No Drawings

AUTODEPOSITABLE ADHESIVE

This application claims benefit of U.S. Provisional Application No. 60/116,767, filed Jan. 22, 1999.

BACKGROUND OF THE INVENTION

The present invention relates to an autodepositable adhesive, particularly an adhesive for bonding an elastomeric material to a metallic material.

It is generally known that the corrosion resistance of metal substrates can be improved by coating the substrate with an autodeposition composition that generally comprise an aqueous solution of an acid, an oxidizing agent and a dispersed resin. Immersion of a metallic surface in an autodeposition composition produces what is said to be a self-limiting protective coating on a metal substrate. The general principles and advantages of autodeposition are explained in a multitude of patents assigned to Parker Amchem and/or Henkel (see, for example, U.S. Pat. Nos. 4,414,350; 4,994,521; 5,427,863; 5,061,523 and 5,500,460). However, to the best of the inventors' knowledge these autodeposition compositions have not been successfully used as one coat adhesives or covercoat adhesives.

Elastomer-to-metal bonding is subjected to severe environmental conditions in many industrial and automotive assemblies. For example, many engine mounting assemblies that employ elastomer-to-metal bonding contain fluids in order to assist in damping of vibration of the engine. These fluid-filled engine mounting devices are being increasingly exposed to high temperatures such that the elastomer-to-metal adhesive bonds within the mounts are being exposed to very high temperature fluid environments. Many elastomer-to-metal assemblies, particularly those utilized in automobile applications, are routinely exposed to materials that contain corrosive salts or other corrosive materials that may act to degrade the elastomer-to-metal adhesive bond.

In light of the increasing regulations regarding volatile organic compounds (VOC), the use of traditional solvent-borne adhesives is becoming more problematic. Consequently, there is significant ongoing work to develop water-borne replacements. Current aqueous adhesives suffer from user drawbacks. Application of an adhesive by dipping the adherend in a bath of the adhesive is frequently preferred by the user due to its simplicity. However, dipping of aqueous adhesives leads to problems with controlling the film thickness and dripping.

SUMMARY OF THE INVENTION

According to the present invention there is provided a method for bonding two substrates comprising applying an autodepositable adhesive to one of the substrates and then bonding the substrates together. This method is especially useful for bonding elastomers to metals.

According to a first embodiment, the autodepositable adhesive is a one coat adhesive having a low pH (approximately 1–3) and including (A) a flexibilizer or film-former, (B) optionally, an aqueous dispersion of a phenolic resin that includes water and a reaction product of a phenolic resin precursor, a modifying agent and, optionally, a multi-hydroxy phenolic compound wherein the modifying agent includes at least one functional moiety that enables the modifying agent to react with the phenolic resin precursor and at least one ionic moiety, and (C) an acid. According to a more particular embodiment of a one coat adhesive, the adhesive further includes a control agent that improves the, uniformity of the film thickness formed by the adhesive. Organic nitro compounds are the preferred control agents. According to another particular embodiment of a one coat adhesive, the adhesive further includes a crosslinker that improves the adhesive performance. The crosslinker can be an aromatic nitroso compound or aromatic nitroso compound precursor.

According to a second embodiment, the autodepositable adhesive is a covercoat adhesive that includes a flexibilizer or film-former that is a latex that coagulates when exposed to metallic ions generated from the metallic substrate upon which the covercoat is applied. The covercoat preferably also includes a crosslinker as described above in connection with the one coat embodiment.

The one coat autodepositable adhesive can be autodeposited on a metal substrate and then an elastomeric substrate is contacted to the metal substrate to effect bonding of the metal substrate to the elastomeric substrate. The covercoat autodepositable adhesive preferably is applied onto a metal substrate that has been previously treated or coated with an autodepositable metal treatment composition or primer. The autodepositable metal treatment or primer provides the acidic environment that generates metal ions thereby activating the autodeposition characteristic of the autodepositable covercoat adhesive.

An autodepositable adhesive provides for easier film thickness control, increased film thickness uniformity and substantially eliminates dripping. The autodepositable adhesive also is substantially free of volatile organic compounds.

DETAILED DESCRIPTION OF THE PREFERRED EMBODIMENTS

Unless otherwise indicated, description of components in chemical nomenclature refers to the components at the time of addition to any combination specified in the description, but does not necessarily preclude chemical interactions among the components of a mixture once mixed.

Certain terms used in this document are defined below.

"Phenolic compound" means a compound that includes at least one hydroxy functional group attached to a carbon atom of an aromatic ring. Illustrative phenolic compounds include unsubstituted phenol per se, substituted phenols such as alkylated phenols and multi-hydroxy phenols, and hydroxy-substituted multi-ring aromatics. Illustrative alkylated phenols include methylphenol (also known as cresol), dimethylphenol (also known as xylenol), 2-ethylphenol, pentylphenol and tert-butyl phenol. "Multi-hydroxy phenolic compound" means a compound that includes more than one hydroxy group on each aromatic ring. Illustrative multi-hydroxy phenols include 1,3-benzenediol (also known as resorcinol), 1,2-benzenediol (also known as pyrocatechol), 1,4-benzenediol (also known as hydroquinone), 1,2,3-benzenetriol (also known as pyrogallol), 1,3,5-benzenetriol and 4-tert-butyl-1,2-benzenediol (also known as tert-butyl catechol). Illustrative hydroxy-substituted multi-ring aromatics include 4,4'-isopropylidenebisphenol (also known as bisphenol A), 4,4'methylidenebisphenol (also known as bisphenol F) and naphthol.

"Aldehyde compound" means a compound having the generic formula RCHO. Illustrative aldehyde compounds include formaldehyde, acetaldehyde, propionaldehyde, n-butylaldehyde, n-valeraldehyde, caproaldehyde, heptaldehyde and other straight-chain aldehydes having up to 8 carbon atoms, as well as compounds that decompose to formaldehyde such as paraformaldehyde, trioxane, furfural, hexamethylenetriamine, acetals that liberate formaldehyde on heating, and benzaldehyde.

"Phenolic resin" generally means the reaction product of a phenolic compound with an aldehyde compound. The molar ratio of the aldehyde compound (for example, formaldehyde) reacted with the phenolic compound is referred to herein as the "F/P ratio". The FJP ratio is calculated on a per hydroxy-substituted aromatic ring basis.

"Phenolic resin precursor" means an unmodified or conventional phenolic resin that is reacted with the aromatic modifying agent to produce the phenolic resin that is dispersed in an aqueous phase.

As described above, there are two embodiments of the invention—one coat and covercoat. "One coat adhesive" means a composition that by itself adheres together two substrate surfaces without the need for a primer. For example, a one coat adhesive according to the invention can be directly applied to a metal surface that has been simply conventionally treated or converted such as by phosphatizing, degreasing/descaling or grit blasting. "Covercoat adhesive" means a composition that is applied over a primer or autodepositable metal treatment composition to enable the bonding of two substrate surfaces.

The flexibilizer or film-former can be any ingredient that forms a film and/or any material that contributes flexibility and/or toughness to the film formed from the composition. The toughness provided by the flexibilizer provides fracture resistance to the film. The flexibilizer should be non-glassy at ambient temperature and an aqueous emulsion latex or aqueous dispersion that is compatible with the other components of the adhesive. The flexibilizer preferably is formulated into the adhesive composition in the form of an aqueous emulsion latex or aqueous dispersion.

In the covercoat adhesive embodiment of the invention the flexibilizer should destabilize by metal ions from the substrate so that it can.coagulate when applied to a metal substrate that has been previously activated through application of an acidic metal treatment or primer.

Suitable flexibilizers include aqueous latices, emulsions or dispersions of (poly)butadiene, neoprene, styrene-butadiene rubber, acrylonitrile-butadiene rubber (also known as nitrile rubber), halogenated polyolefin, acrylic polymer, urethane polymer, ethylene-propylene copolymer rubber, ethylene-propylene-diene terpolymer rubber, styrene-acrylic copolymer, polyamide, poly(vinyl acetate) and the like. Halogenated polyolefins, nitrile rubbers and styrene-acrylic copolymers are preferred.

A suitable styrene-acrylic polymer latex is commercially available from Goodyear Tire & Rubber under the trade designation PLIOTEC and described, for example, in U.S. Pat. Nos. 4,968,741; 5,122,566 and 5,616,635. According to U.S. Pat. No. 5,616,635, such a copolymer latex is made from 45-85 weight percent vinyl aromatic monomers, 15-50 weight percent of at least one alkyl acrylate monomer and 1–6 weight percent unsaturated carbonyl compound. Styrene is the preferred vinyl aromatic monomer, butyl acrylate is the preferred acrylate monomer and acrylic acid and methacrylic acid are the preferred unsaturated carbonyl compound. The mixture for making the latex also includes at least one phosphate ester surfactant, at least one water-insoluble nonionic surface active agent and at least one free radical initiator.

If nitrile rubber is the flexibilizer, it is preferably mixed into the composition as an emulsion latex. It is known in the art that nitrile rubber emulsion latices are generally made from at least one monomer of acrylonitrile or an alkyl derivative thereof and at least one monomer of a conjugated diene, preferably butadiene. According to U.S. Pat. No. 4,920,176 the acrylonitrile or alkyl derivative monomer should be present in an amount of 0 or 1 to 50 percent by weight based on the total weight of the monomers. The conjugated diene monomer should be present in an amount of 50 percent to 99 percent by weight based on the total weight of the monomers. The nitrile rubbers can also optionally include various co-monomers such as acrylic acid or various esters thereof, dicarboxylic acids or combinations thereof. The polymerization of the monomers typically is initiated via free radical catalysts. Anionic surfactants typically are also added. A suitable nitrile rubber latex is available from B.F. Goodrich under the trade designation HYCAR.

Representative halogenated polyolefins include chlorinated natural rubber, chlorine- and bromine-containing synthetic rubbers including polychloroprene, chlorinated polychloroprene, chlorinated polybutadiene, hexachloropentadiene, butadienethalogenated cyclic conjugated diene adducts, chlorinated butadiene styrene copolymers, chlorinated ethylene propylene copolymers and ethylene/propylene/non-conjugated diene terpolymers, chlorinated polyethylene, chlorosulfonated polyethylene, poly(2,3-dichloro-1,3-butadiene), brominated poly(2,3-dichloro-1,3-butadiene), copolymers of (x-haloacrylonitriles and 2,3-dichloro-1,3-butadiene, chlorinated poly(vinyl chloride) and the like including mixtures of such halogen-containing elastomers.

Latices of the halogenated polyolefin can be prepared according to methods known in the art such as by dissolving the halogenated polyolefin in a solvent and adding a surfactant to the resulting solution. Water can then be added to the solution under high shear to emulsify the polymer. The solvent is then stripped to obtain a latex. The latex can also be prepared by emulsion polymerization of the halogenated ethylenically unsaturated monomers.

Butadiene latices are particularly preferred as the film-former or flexibilizer. Methods for making butadiene latices are well known and are described, for example, in U.S. Pat. Nos. 4,054,547 and 3,920,600, both incorporated herein by reference. In addition, U.S. Pat. Nos. 5,200,459; 5,300,555; and 5,496,884 disclose emulsion polymerization of butadiene monomers in the presence of polyvinyl alcohol and a co-solvent such as an organic alcohol or a glycol.

The butadiene monomers useful for preparing the butadiene polymer latex can essentially be any monomer containing conjugated unsaturation. Typical monomers include 2,3-dichloro-1,3-butadiene; 1,3-butadiene; 2,3-dibromo-1,3-butadiene isoprene; isoprene; 2,3-dimethylbutadiene; chloroprene; bromoprene; 2,3-dibromo-1,3-butadiene; 1,1,2-trichlorobutadiene; cyanoprene; hexachlorobutadiene; and combinations thereof. It is particularly preferred to use 2,3-dichloro-1,3-butadiene since a polymer that contains as its major portion 2,3-dichloro-1,3-butadiene monomer units has been found to be particularly useful in adhesive applications due to the excellent bonding ability and barrier properties of the 2,3-dichloro-1,3-butadiene-based polymers. As described above, an especially preferred embodiment of the present invention is one wherein the butadiene polymer includes at least 60 weight percent, preferably at least 70 weight percent, 2,3-dichloro-1,3-butadiene monomer units.

The butadiene monomer can be copolymerized with other monomers. Such copolymerizable monomers include ax-haloacrylonitriles such as α-bromoacrylonitrile and α-chloroacrylonitrile; α,β-unsaturated carboxylic acids such as acrylic, methacrylic, 2-ethylacrylic, 2-propylacrylic, 2-butylacrylic and itaconic acids; alkyl-2-haloacrylates such as ethyl-2-chloroacrylate and ethyl-2-bromoacrylate; α-bromovinylketone; vinylidene chloride; vinyl toluenes; vinylnaphthalenes; vinyl ethers, esters and ketones such as methyl vinyl ether, vinyl acetate and methyl vinyl ketone; esters amides, and nitriles of acrylic and methacrylic acids such as ethyl acrylate, methyl methacrylate, glycidyl acrylate, methacrylamide and acrylonitrile; and combinations of such monomers. The copolymerizable monomers, if utilized, are preferably α-haloacrylonitrile and/or α,β-unsaturated carboxylic acids. The copolymerizable monomers may be utilized in an amount of 0.1 to 30 weight percent, based on the weight of the total monomers utilized to form the butadiene polymer.

In carrying out the emulsion polymerization to produce the latex other optional ingredients may be employed during the polymerization process. For example, conventional anionic and/or nonionic surfactants may be utilized in order to aid in the formation of the latex. Typical anionic surfactants include carboxylates such as fatty acid soaps from lauric, stearic, and oleic acid; acyl derivatives of sarcosine such as methyl glycine; sulfates such as sodium lauryl sulfate; sulfated natural oils and esters such as Turkey Red Oil; alkyl aryl polyether sulfates; alkali alkyl sulfates; ethoxylated aryl sulfonic acid salts; alkyl aryl polyether sulfonates; isopropyl naphthalene sulfonates; sulfosuccinates; phosphate esters such as short chain fatty alcohol partial esters of complex phosphates; and orthophosphate esters of polyethoxylated fatty alcohols. Typical nonionic surfactants include ethoxylated (ethylene oxide) derivatives such as ethoxylated alkyl aryl derivatives; mono- and polyhydric alcohols; ethylene oxide/propylene oxide block copolymers; esters such as glyceryl monostearate; products of the dehydration of sorbitol such as sorbitan monostearate and polyethylene oxide sorbitan monolaurate; amines; lauric acid; and isopropenyl halide. A conventional surfactant, if utilized, is employed in an amount of 0.01 to 5 parts, preferably 0.1 to 2 parts, per 100 parts by weight of total monomers utilized to form the butadiene polymer.

In the case of dichlorobutadiene homopolymers, anionic surfactants are particularly useful. Such anionic surfactants include alkyl sulfonates and alkyl aryl sulfonates (commercially available from Stepan under the trade designation POLYSTEP) and sulfonic acids or salts of alkylated diphenyl oxide (for example, didodecyl diphenyleneoxide disulfonate or dihexyl diphenyloxide disulfonate commercially available from Dow Chemical Co. under the trade designation DOWFAX).

Chain transfer agents may also be employed during emulsion polymerization in order to control the molecular weight of the butadiene polymer and to modify the physical properties of the resultant polymer as is known in the art. Any of the conventional organic sulfur-containing chain transfer agents may be utilized such as alkyl mercaptans and dialkyl xanthogen disulfides.

The emulsion polymerization is typically triggered by a free radical initiator. Illustrative free radical initiators include conventional redox systems, peroxide systems, azo derivatives and hydroperoxide systems. The use of a redox system is preferred and examples of such systems include ammonium persulfate\sodium metabisulfite, ferric sulfate/ascorbic acid/hydroperoxide and tributylborane/hydroperoxide, with ammonium persulfate/sodium metabisulfite being most preferred.

The emulsion polymerization is typically carried out at a temperature of 10°–90° C., preferably 40°–60° C. Monomer conversion usually ranges from 70-100, preferably 80-100, percent. The latices preferably have a solids content of 10 to 70, more preferably 30 to 60, percent; a viscosity between 50 and 10,000 centipoise at 25° C.; and a particle size between 60 and 300 nanometers.

Especially preferred as the butadiene latex is a butadiene polymer that has been emulsion polymerized in the presence of a styrene sulfonic acid, styrene sulfonate, poly(styrene sulfonic acid), or poly(styrene sulfonate) stabilizer to form the latex. Poly(styrene sulfonate) is the preferred stabilizer. This stabilization system is particularly effective for a butadiene polymer that is derived from at least 60 weight percent dichlorobutadiene monomer, based on the amount of total monomers used to form the butadiene polymer. The butadiene polymer latex can be made by known emulsion polymerization techniques that involve polymerizing the butadiene monomer (and copolymerizable monomer, if present) in the presence of water and the styrene sulfonic acid, styrene sulfonate, poly(styrene sulfonic acid), or poly (styrene sulfonate) stabilizer. The sulfonates can be salts of any cationic groups such as sodium, potassium or quaternary ammonium. Sodium styrene sulfonate is a preferred styrene sulfonate compound. Poly(styrene sulfonate) polymers include poly(styrene sulfonate) homopolymer and poly (styrene sulfonate) copolymers such as those with maleic anhydride. Sodium salts of poly(styrene sulfonate) are particularly preferred and are commercially available from National Starch under the trade designation VERSA TL. The poly(styrene sulfonate) can have a weight average molecular weight from $5 \times 10^4$ to $1.5 \times 10^6$, with $1.5 \times 10^5$ to $2.5 \times 10^5$ being preferred. In the case of a poly(styrene sulfonate) or poly(styrene sulfonic acid) it is important to recognize that the emulsion polymerization takes place in the presence of the pre-formed polymer. In other words, the butadiene monomer is contacted with the pre-formed poly(styrene sulfonate) or poly(styrene sulfonic acid). The stabilizer preferably is present in an amount of 0.1 to 10 parts, preferably 1 to 5 parts, per 100 parts by weight of total monomers utilized to form the butadiene polymer.

The flexibilizer or film-former should be present in the adhesive in an amount of 5 to 60, preferably 20 to 30, weight percent, based on the total dry weight of all the components of the adhesive.

The phenolic resin dispersion (B) is optional component, but typically is present in the one coat adhesive embodiment. The phenolic resin dispersion (B) is disclosed in commonly assigned PCT Patent Application Publication No. WO 99/37712, corresponding to U.S. patent application Ser. No. 09/235,777, filed Jan. 22, 1999, incorporated herein by reference. The phenolic resin dispersion (B) of the inventive composition can be obtained by reacting or mixing a phenolic resin precursor and a modifying agent-theoretically via a condensation reaction between the phenolic resin precursor and the modifying agent.

One functional moiety of the modifying agent provides the ionic pendant group that enables stable dispersion of the phenolic resin. Without the ionic pendant group, the phenolic resin would be unable to maintain a stable dispersion in water. Since the ionic pendant group provides for the stability of the dispersion there is no need, or at the most a minimal need, for surfactants. The presence of surfactants in an aqueous composition is a well-known hindrance to the composition's performance.

The other important functional moiety in the modifying agent enables the modifying agent to react with the phenolic resin precursor. The modifying agent can contain more than one ionic pendant group and more than one reaction-enabling moiety.

Incorporation of aromatic sulfonate functional moieties into the phenolic resin structure via condensation is the preferred method of providing the ionic pendant groups. Accordingly, one class of ionic moieties is substituents on an aromatic ring that include a sulfur atom covalently or ionically bonded to a carbon atom of the aromatic ring. Examples of covalently bound sulfur-containing substituents are sulfonate (—S(O)$_2$O$^-$M$^+$), sulfinate (—S(O)O$^-$M$^+$), sulfenate (—SO$^-$M$^+$) and oxysulfonate (—OS(O)$_2$O$^-$M$^+$), wherein M can be any monovalent ion such as Na, Li, K, or NR$^1$$_3$ (wherein R$^1$ is hydrogen or an alkyl). Another example of a covalently bound substituent is sulfate ion. Sulfonate is the referred ionic group. The modifying agent should not include or introduce any multivalent ions into the phenolic resin dispersion since it is expected that the presence of multivalent ions would cause the phenolic resin to precipitate rather than remain dispersed.

The reaction-enabling functional moiety of the modifying agent can be any functional group that provides a site on the modifying agent for undergoing condensation with a phenolic resin. If the phenolic resin precursor is a resole, the modifying agent reacts with an alkylol or benzyl ether group of the resole. If the modifying agent is aromatic, the reaction-enabling functional moiety is a substituent on the aromatic ring that causes a site on the ring to be reactive to the alkylol or benzyl ether of the resole precursor. Examples of such a substituent are hydroxy or hydroxyalkyl, with hydroxy being preferred. The hydroxy- or hydroxyalkyl-substituted aromatic modifying agent is reactive at a site ortho and/or para to each hydroxy or hydroxyalkyl substituent. In other words, the aromatic modifying agent is bonded to, or incorporated into, the phenolic resin precursor at sites on the aromatic ring of the modifying agent that are ortho and/or para to a hydroxy or hydroxyalkyl substituent. At least two reaction-enabling functional moieties are preferred to enhance the reactivity of the aromatic modifying agent with the phenolic resin precursor.

Alternatively, the reaction-enabling functional moiety of the modifying agent can be a formyl group (-CHO), preferably attached to a carbon atom of an aromatic ring. In this instance, the phenolic resin precursor is a novolak rather than a resole. The novolak precursor is reacted via an acid catalyzed aldehyde condensation reaction with the formyl group-containing modifying agent so that the formyl group forms a divalent methylene linkage to an active site on an aromatic ring of the backbone structure of the novolak precursor. Consequently, the modifying agent structure (including the ionic moiety) is incorporated into the phenolic structure through the generated methylene linkage. Examples of such formyl group-containing modifying agents include 2-formylbenzene sulfonate, 5-formylfuran sulfonate and (R)(SO$_3$)CH-CH$_2$—C(O)(H) compounds wherein R is C$_{1-C4}$ alkyl groups.

Another alternative reaction-enabling functional moiety could be a diazo group (—N$_2$$^+$), preferably attached to a carbon atom of an aromatic ring. In this instance, the phenolic resin precursor is a novolak rather than a resole. The novolak precursor is reacted via a diazo coupling reaction with the diazo group-containing modifying agent so that the diazo group forms a divalent diazo linkage (—N=) to an active site on an aromatic ring of the backbone structure of the novolak precursor. Consequently, the modifying agent structure (including the ionic moiety) is incorporated into the phenolic structure through the diazo linkage. An example of such a diazo modifying agent is 1-diazo-2-naphthol-4-sulfonic acid.

The modifying agent also can optionally include a functional moiety that is capable of chelating with a metal ion that is present on a substrate surface on which the phenolic resin dispersion is applied. The chelating group remains as a residual group after the condensation of the phenolic resin precursor and the aromatic modifying agent. Typically, the chelating group is a substituent on the aromatic ring that is capable of forming a 5- or 6-membered chelation structure with a metal ion. Examples of such substituents include hydroxy and hydroxyalkyl, with hydroxy being preferred. At least two such functional groups must be present on the modifying agent molecule to provide the chelating. In the case of an aromatic modifying agent, the chelating groups should be located in an ortho position relative to each other. A significant advantage of the invention is that hydroxy or hydroxyalkyl substituents on the aromatic modifying agent can serve two roles—condensation enablement and subsequent metal chelating.

An aromatic modifying agent is particularly advantageous. Preferably, the ionic group and the reaction-enabling moiety are not substituents on the same aromatic ring. The ionic group, particularly sulfonate, appears to have a strong deactivating effect on condensation reactions of the ring to which it is attached. Consequently, an ionic group attached to the same ring as the reaction-enabling moiety would not allow the modifying agent to readily react with the phenolic resin precursor. However, it should be recognized that this consideration for the location of the ionic and reaction-enabling moieties is not applicable to the formyl group-containing modifying agent and diazo modifying agent.

A preferred structure for the aromatic modifying agent is represented by formulae Ia or Ib below:

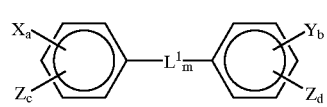

Formula Ia

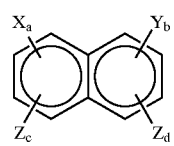

Formula Ib wherein X is the ionic group; Y is the reaction-enabling substituent; Z is the chelating substituent; L$^1$ is a divalent linking group such as an alkylene radical (for example, methylene) or a diazo (—N=N—); a is 1; b is 1 to 4; m is 0 or 1; and c and d are each independently 0 to 3, provided there are not more than 4 substituents on each aromatic ring. If a chelating group Z is present it is positioned ortho to another chelating group Z or to Y. It should be recognized that the reaction-enabling substituent Y may also act as a chelating substituent. In this instance, the aromatic modifying agent may not include an independent chelating substituent Z. An aromatic modifying agent according to formulae Ia or Ib could also include other substituents provided they do not adversely interfere with the ionic group or the condensation reaction.

Illustrative aromatic modifying agents include salts of 6,7-dihydroxy-2-napthalenesulfonate; 6,7-dihydroxy-1-naphthalenesulfonate; 6,7-dihydroxy-4-napthalenesulfonate; Acid Red 88; Acid Alizarin Violet N; Erichrome Black T; Erichrome Blue Black B; Brilliant Yellow; Crocein Orange G; Biebrich Yellow; and Palatine Chrome Black 6BN. 6,7-dihydroxy-2-naphthalenesulfonate, sodium salt is the preferred aromatic modifying agent.

It should be recognized that the preferred sulfonate modification contemplated herein involves an indirect sulfonation mechanism. In other words, the aromatic modifying agent includes a sulfonate group and is reacted with another aromatic compound (the phenolic resin precursor) to obtain the chain extended, sulfonate-modified phenolic resin product. This indirect sulfonation is distinctly different than direct sulfonation of the phenolic resin precursor.

Any phenolic resin could be employed as the phenolic resin precursor, but it has been found that resoles are especially suitable. The resole precursor should have a sufficient amount of active alkylol or benzyl ether groups that can initially condense with the modifying agent and then undergo further subsequent condensation. Of course, the phenolic resin precursor has a lower molecular weight than the final dispersed resin since the precursor undergoes condensation to make the final dispersed resin. Resoles are prepared by reacting a phenolic compound with an excess of an aldehyde in the presence of a base catalyst. Resole resins are usually supplied and used as reaction product mixtures of monomeric phenolic compounds and higher molecular weight condensation products having alkylol (—ArCH$_2$—OH) or benzyl ether termination (—ArCH$_2$—O—CH$_2$Ar), wherein Ar is an aryl group. These resole mixtures or prepolymers (also known as stage A resin) can be transformed into three-dimensional, crosslinked, insoluble and infusible polymers by the application of heat.

The reactants, conditions and catalysts for preparing resoles suitable for the resole precursor of the present invention are well known. The phenolic compound can be any of those previously listed or other similar compounds, although multi-hydroxy phenolic compounds are undesirable. Particularly preferred phenolic compounds for making the resole precursor include phenol per se and alkylated phenol. The aldehyde also can be any of those previously listed or other similar compounds, with formaldehyde being preferred. Low molecular weight, water soluble or partially water soluble resoles are preferred as the precursor because such resoles maximize the ability to condense with the modifying agent. The F/P ratio of the resole precursor should be at least 0.90. Illustrative commercially available resoles that are suitable for use as a precursor include a partially water soluble resole available from Georgia Pacific under the trade designation BRL 2741 and a partially water soluble resoles available from Schenectady International under the trade designations HRJ 11722 and SG3100.

As described above, the dispersed phenolic resin reaction product according to the invention can be hydrophilic or hydrophobic, but hydrophilic is preferred. In addition, dispersed resoles or novolaks can be obtained depending upon the selection and amount of reactants.

Preferably, the dispersed resole is produced by reacting or mixing 1 mol of modifying agent(s) with 1 to 20 mol of phenolic resin precursor(s). A dispersed resole typically can be obtained by reacting or mixing a resole precursor or a mixture of resole precursors with the modifying agent or a mixture of agents without any other reactants, additives or catalysts. However, other reactants, additives or catalysts can be used as desired. Multi-hydroxy phenolic compound (s) can optionally be included in relatively small amounts in the reactant mixture for the resole.

Hydrophilic resoles typically have a F/P ratio of at least 1.0. According to the invention, hydrophilic resoles having a F/P ratio much greater than 1.0 can be successfully dispersed. For example, it is possible to make an aqueous dispersion of hydrophilic resoles having a F/P ratio of at least 2 and approaching 3, which is the theoretical F/P ratio limit.

Preferably, the dispersed novolak is produced by reacting 1 mol of modifying agent(s) with 2-20 mol of phenolic resin precursor(s) and, preferably, 2–20 mol of multi-hydroxy phenolic compound(s). An aldehyde compound, preferably formaldehyde, is also required to make the novolak. The aldehyde compound can optionally be added as a separate ingredient in the initial reaction mixture or the aldehyde compound can be generated in situ from the resole precursor. The resole precursor(s), multi-hydroxy phenolic compound (s) and modifying agent(s) co-condense to form the dispersed novolak. The reaction typically is acid catalyzed with an acid such as phosphoric acid. The F/P ratio of aldehyde compound(s) to combined amount of resole precursor(s) and multi-hydroxy phenolic compound(s) in the initial reaction mixture preferably is less than 0.9. Preferably, synthesis of the dispersed novolak is a two stage reaction. In the first stage, the resole precursor(s) is reacted with the modifying agent(s) and, optionally, a small amount of multi-hydroxy phenolic compound(s). Once this first stage reaction has reached the desired point (i.e. the resin can be readily formed into a translucent dispersion), the acid catalyst and a greater amount of multi-hydroxy phenolic compound(s) is added to the reaction mixture. Pyrocatechol (also simply known as catechol) is a preferred multi-hydroxy phenolic compound for reacting in the first stage and resorcinol is a preferred multi-hydroxy phenolic compound for reacting in the second stage.

Hydrophilic novolaks typically have a hydroxy equivalents of between 1 and 3 per aromatic ring. Preferably, dispersed hydrophilic novolaks according to the invention have a hydroxy equivalents of 1.1 to 2.5, more preferably 1.1 to 2.0. The hydroxy equivalents is calculated based on the amount of multi-hydroxy phenolic compounds used to make the novolak.

According to a preferred embodiment, the dispersed phenolic resin reaction product contains a mixture of oligomers having structures believed to be represented by the following formulae IIa or IIb:

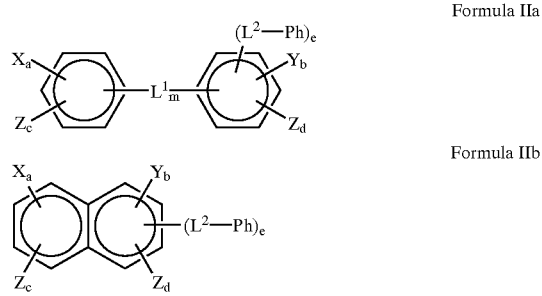

Formula IIa

Formula IIb wherein X, Y, Z and L$^1$ and subscripts a, b, c, d and m are the same as in formulae Ia and Ib, e is 1 to 6, L$^2$ is a divalent linking group and Ph is the phenolic resin backbone structure, provided the —(L$^2$—Ph) group(s) is(are) ortho or para to a Y group. L$^2$ depends upon the particular phenolic resin, but typically is a divalent alkylene radical such as methylene (—CH$_2$—) or oxydimethylene (—CH$_2$—O—CH$_2$—). Preferably, e is 2 and the —(L$^2$—Ph) groups are in para position to each other.

According to a particularly preferred embodiment wherein the phenolic resin is a resole and the modifying agent is a naphthalene having a ionic pendant group X and two reaction-enabling substituents Y, the dispersed phenolic resin reaction product contains a mixture of oligomers having structures believed to be represented by the following formula III:

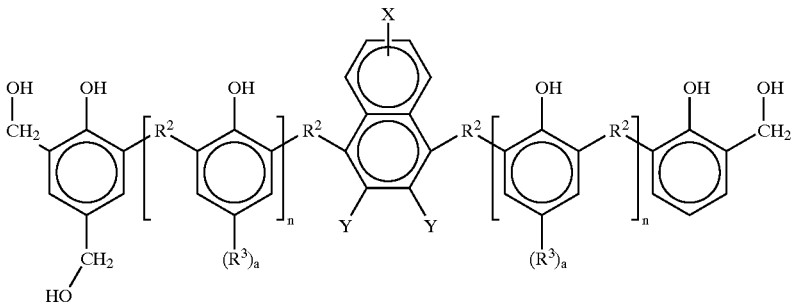

wherein X and Y are the same as in formulae Ia and Ib, a is 0 or 1; n is 0 to 5; $R^2$ is independently -C($R^5$)$_2$- or -C($R^5$)$_2$-O-C($R^5$)$_2$-, wherein $R^5$ is independently hydrogen, alkylol, hydroxyl, alkyl, aryl or aryl ether; and $R^3$ is independently alkylol, alkyl, aryl, alkylaryl or aryl ether. Preferably, $R^2$ is methylene or oxydimethylene and $R^3$ is methylol. If 6,7-dihydroxy-2-naphthalenesulfonate, sodium salt is the modifying agent, X will be $SO_3^-Na^+$ and each Y will be OH. It should be recognized that in this case the hydroxy groups for Y will also act as chelating groups with a metal ion.

According to another preferred embodiment wherein the phenolic resin is a novolak and the modifying agent is a naphthalene having a ionic pendant group X and two reaction-enabling substituents Y, the dispersed phenolic resin reaction product contains a mixture of oligomers having structures believed to be represented by the following formula IV:

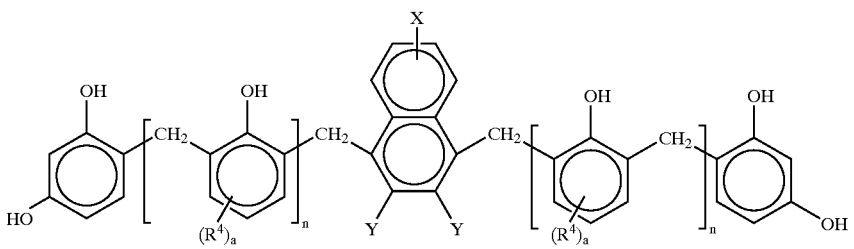

wherein X and Y are the same as in formulae Ia and Ib, a is 0 or 1, n is 0 to 5 and $R^4$ is independently hydroxyl, alkyl, aryl, alkylaryl or aryl ether. Preferably, $R^4$ is tert-butyl. If 6,7-dihydroxy-2-naphthalenesulfonate, sodium salt is the modifying agent, X will be $SO_{03}^-Na^+$ and each Y will be OH. In this case the hydroxy groups for Y will also act as chelating groups with a metal ion.

It should be recognized that the dispersed phenolic resin reaction product may contain oligomers or compounds having structures that vary from the idealized structures shown in formulae III and IV.

If the modifying agent includes a sulfur-containing ionic group, the resulting modified phenolic resin should have a carbon/sulfur atom ratio of 20:1 to 200:1, preferably 20:1 to 100:1. If the sulfur content is greater than the 20:1 carbon/sulfur atom ratio, the modified phenolic resin begins to become water soluble, is more stable with respect to multivalent ions and is difficult to thermoset. These characteristics are adverse to the preferred use of the phenolic resin dispersion of the invention. If the sulfur content is below the 200:1 carbon/sulfur atom ratio, then the resin dispersion cannot maintain its stability. Viewed another way, the dispersed phenolic resins have 0.01 to 0.10, preferably 0.03 to 0.06, equivalents of sulfonate functionality/100 g resin. The aqueous dispersion of the phenolic resin preferably has a solids content of 1 to 50, preferably 15 to 30.

The modifying agent and the phenolic resin precursor can be reacted or mixed under conditions effective to promote condensation of the modifying agent with the phenolic resin precursor. The reaction is carried out in water under standard phenolic resin condensation techniques and conditions. The reactant mixture (including water) generally is heated from 50 to 100° C. under ambient pressure, although the specific temperature may differ considerably depending upon the specific reactants and the desired reaction product. The resulting product is a concentrate that is self-dispersible upon the addition of water and agitation to reach a desired solids content. The final dispersion can be filtered to remove any gelled agglomerations.

The intermediate modified resoles or novolaks that are initially produced in the synthesis are not necessarily water dispersible, but as the chain extension is advanced the resulting chain extended modified resoles or novolaks become progressively more water dispersible by simple mechanical agitation. The chain extension for the dispersed resole is determined by measuring the viscosity of the reaction mixture. Once the resole reaction mixture has reached the desired viscosity, which varies depending upon the reactant composition, the reaction is stopped by removing the heat. The chain extension for the dispersed novolak is determined by pre-selecting the F/P ratio of the total reaction mixture (in other words, the amount of aldehyde compound(s) relative to the amount of phenolic(s) in both the first and second stages). The reaction for the novolak is allowed to proceed until substantially all of the total amount of the reactants have reacted. In other words, there is essentially no unreacted reactant remaining. Preferably, the molecular weight (i.e., chain extension) of both the resole and novolak should be advanced to just below the gel point.

The phenolic resin dispersion can be present in the composition of the invention in an amount of 5 to 75 weight percent based on the total dry weight of the composition. Preferably, the phenolic resin dispersion is present in the control agent-containing one coat embodiment in an amount of 40 to 60 weight percent, based on the total dry weight of the composition. Preferably, the phenolic resin dispersion is present in the crosslinker-containing one coat embodiment in an amount of 5 to 20 weight percent, based on the total dry weight of the composition.

The acid (C) can be any acid that is capable of adjusting the pH of the adhesive composition to 1–3. Illustrative acids include hydrofluoric acid, phosphoric acid, sulfuric acid, hydrochloric acid and nitric acid. Aqueous solutions of phosphoric acid are preferred. When the acid is mixed into the composition presumably the respective ions are formed and exist as independent species in addition to the presence of the free acid. In other words, in the case of phosphoric acid, phosphate ions and free phosphoric acid co-exist in the formulated final multi-component composition. The acid preferably is present in an amount of 5 to 300 parts by weight, more preferably 10 to 160 parts by weight, based on 100 parts by weight of the phenolic novolak resin dispersion (B). The covercoat embodiment preferably does not include an acid.

Water, preferably deionized water, is utilized in the adhesive composition of the invention in order to vary the solids content and to provide a carrier fluid for mixing the ingredients of the adhesive and delivering the adhesive to a substrate surface. Since the adhesive composition is waterborne, it is substantially free of volatile organic compounds.

According to one embodiment of the one coat adhesive, there is included a control agent that improves the uniformity of the film thickness formed by the adhesive. The control agent may be a[]nitro compound, a nitroso compound, an oxime compound, a nitrate compound, or a similar material. A mixture of control agents may be used. Organic nitro compounds are the preferred control agents.

The organic nitro compound is any material that includes a nitro group ($-NO_2$) bonded to an organic moiety. Preferably, the organic nitro compound is water soluble or, if water insoluble, capable of being dispersed in water. Illustrative organic nitro compounds include nitroguanidine; aromatic nitrosulfonates such as nitro or dinitrobenzenesulfonate and the salts thereof such as sodium, potassium, amine or any monovalent metal ion (particularly the sodium salt of 3,5-dinitrobenzenesulfonate); Naphthol Yellow S; and picric acid (also known as trinitrophenol). Especially preferred for commercial availability and regulatory reasons is a mixture of nitroguanidine and sodium nitrobenzenesulfonate.

The amount of control agent(s) in the adhesive composition may vary, particularly depending upon the amount of any acid in the composition. Preferably, the amount is up to 20 weight %, more preferably up to 10 weight %, and most preferably 2 to 5 weight %, based on the total amount of non-volatile ingredients in the adhesive composition. According to a preferred embodiment, the weight ratio of nitroguanidine to sodium nitrobenzenesulfonate should range from 1:10 to 5:1.

The organic nitro compound typically is mixed into the composition in the form of an aqueous solution or dispersion. For example, nitroguanidine is a solid at room temperature and is dissolved in water prior to formulating into the composition.

A crosslinker is useful in an embodiment of the one coat adhesive and in the covercoat adhesive. The crosslinker can be an aromatic nitroso compound or aromatic nitroso compound precursor. The aromatic nitroso compound can be any aromatic hydrocarbon, such as benzenes, naphthalenes, anthracenes, biphenyls, and the like, containing at least two nitroso groups attached directly to non-adjacent ring carbon atoms. Such aromatic nitroso compounds are described, for example, in U.S. Pat. No. 3,258,388; U.S. Pat. No. 4,119, 587 and U.S. Pat. No. 5,496,884. The aromatic nitroso compound or aromatic nitroso compound precursor, if present, is preferably in an amount of 5 to 60, more preferably 20 to 30, weight percent, based on the total dry weight of the adhesive. An aromatic nitroso compound precursor is preferred.

More particularly, such nitroso compounds are described as aromatic compounds having from 1 to 3 aromatic nuclei, including fused aromatic nuclei, having from 2 to 6 nitroso groups attached directly to non-adjacent nuclear carbon atoms. The preferred nitroso compounds are the dinitroso aromatic compounds, especially the dinitrosobenzenes and dinitrosonaphthalenes, such as the meta- or para-dinitrosobenzenes and the meta- or para-dinitrosonaphthalenes. The nuclear hydrogen atoms of the aromatic nucleus can be replaced by alkyl, alkoxy, cycloalkyl, aryl, aralkyl, alkaryl, arylamine, arylnitroso, amino, halogen and similar groups. Thus, where reference is made herein to "aromatic nitroso compound" it will be understood to include both substituted and unsubstituted nitroso compounds.

Particularly preferred nitroso compounds are characterized by the formula:

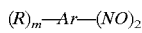

wherein Ar is selected from the group consisting of phenylene and naphthalene; R is a monovalent organic radical selected from the group consisting of alkyl, cycloalkyl, aryl, aralkyl, alkaryl, arylamine and alkoxy radicals having from 1 to 20 carbon atoms, amino, or halogen, and is preferably an alkyl group having from 1 to 8 carbon atoms; and m is 0,1,2,3, or 4, and preferably is 0.

Exemplary suitable aromatic nitroso compounds include m-dinitrosobenzene, p-dinitrosobenzene, m-dinitrosonaphthalene, p-dinitrosonaphthalene, 2,5-dinitroso-p-cymene, 2-methyl-1,4-dinitrosobenzene, 2-methyl-5-chloro-1,4- dinitrosobenzene, 2-fluoro-1,4-dinitrosobenzene, 2-methoxy-1-3-dinitrosobenzene, 5-chloro- 1,3-dinitrosobenzene, 2-benzyl-1,4-dinitrosobenzene, 2-cyclohexyl-1,4-dinitrosobenzene and combinations thereof. Particularly preferred are m-dinitrosobenzene and p-dinitrosobenzene.

The aromatic nitroso compound precursor may be essentially any compound that is capable of being converted, typically by oxidation, to a nitroso compound at elevated temperatures, typically from about 140–200° C. This conversion usually occurs during the bonding procedure used with the adhesive. The most common aromatic nitroso compound precursors are quinone compounds. Examples of such quinone compounds include quinone dioxime, dibenzoquinone dioxime, 1,2,4,5-tetrachlorobenzoquinone, 2-methyl-1,4-benzoquinone dioxime, 1,4-naphthoquinone dioxime, 1,2-naphthoquinone dioxime and 2,6-naphthoquinone dioxime. Quinone dioxime is especially preferred.

Additional ingredients can be included in the adhesive composition. Such ingredients include metal oxides, inert fillers, polymeric film-forming adjuncts, surfactants, dispersing agents, wetting agents, pigments, carbon black, silica and the like.

The compositions may be prepared by any method known in the art, but are preferably prepared by combining and milling or shaking the ingredients and water in ball-mill, sand-mill, ceramic bead-mill, steel-bead mill, high speed media-mill or the like. It is preferred to add each component to the mixture in a liquid form such as an aqueous dispersion, emulsion or latex.

The composition is applied to a substrate surface by dipping the substrate or part into a bath of the composition. Typically, the metal substrate is dipped into the bath. The metal substrate can reside in the adhesive composition bath for an amount of time sufficient to deposit a uniform film of desired thickness. Typically, the bath residence time is from about 5 to about 120 seconds, preferably about 10 to about 30 seconds, and occurs at room temperature. The composition typically is applied to form a dry film thickness of 10 to 30 $\mu$m.

According to the present invention when the composition is applied to an electrochemically active metal surface under conditions that generate multivalent ions on the surface the multivalent ions appear to cause the composition to deposit on the metal surface a substantially self-limiting, substantially uniform, gelatinous, wet film. The coating that is formed when the composition is in contact with the metal surface is known as the "uncured" state. The subsequent drying of the coating converts the coating to a "cured" stage. The formation of the coating is "self-limiting" in that the coating occurs rapidly initially and then the deposition rate rapidly decreases thus limiting the thickness and areal density (mass per unit area) with time.

In the case of the one coat adhesive embodiment the metal surface activation typically is initiated by the acid that is present in the one coat adhesive composition. In the case of the covercoat adhesive embodiment the metal surface can be activated by the prior application of an autodepositable metal treatment composition that includes an appropriate acid or a primer that includes an appropriate acid. Such metal treatment compositions and primers are respectively described, for example, in commonly assigned PCT Patent Publication No. WO 99/37722 corresponding to U.S. patent application Ser. No. 091235,201, filed Jan. 22, 1999, incorporated herein by reference, and commonly assigned PCT Patent Publication No. WO 99/37713 corresponding to U.S. patent application Ser. No. 09/235,778, filed Jan. 22, 1999, incorporated herein by reference.

The adhesive composition can be used to bond any types of adherends together, but it is particularly useful to bond a metal surface to a polymeric material surface. The polymeric material can be any elastomeric material selected from any of the natural rubbers and olefinic synthetic rubbers including polychloroprene, polybutadiene, neoprene, styrene-butadiene copolymer rubber, acrylonitrile-butadiene copolymer rubber, ethylene-propylene copolymer rubber (EPM), ethylene-propylene-diene terpolymer rubber (EPDM), butyl rubber, brominated butyl rubber, alkylated chlorosulfonated polyethylene and the like. The material may also be a thermoplastic elastomer such as those sold under the trade designations SANTOPRENE and ALCRYN by Monsanto and DuPont, respectively. The metal surface may be selected from any of the common structural metals such as iron, steel (including stainless steel and electrogalvanized steel), lead, aluminum, copper, brass, bronze, MONEL metal alloy, nickel, zinc and the like.

For adhesive bonding, the adhesive composition typically is applied to the metal surface and then dried. The coated metal surface and elastomeric surface are brought together under heat and pressure to complete the bonding procedure. The exact conditions selected will depend upon the particular elastomer being bonded and whether or not it is cured prior to bonding. In some cases, it may be desirable to heat the metal surface prior to application of the primer and/or covercoat composition(s) to assist in drying of the composition(s). The coated metal surface and the elastomeric surface are typically brought together under a pressure of 20 to 175 MPa, preferably from 20 to 50 MPa. If the elastomer is uncured, the resulting elastomer-metal assembly is simultaneously heated to a temperature of 140° C. to 220° C., preferably 160° C. to 200° C. The assembly should remain under the applied pressure and temperature for a period of 1 minute to 60 minutes, depending on the cure rate and thickness of the elastomeric substrate. If the elastomer is already cured, the bonding temperature may range from 90° C. to above 180° C. for 15 to 126 minutes.

The bonding process may be carried out by introducing the elastomer as a semi-molten material to the metal surface as in, for example, an injection-molding process. The process may also be carried out by utilizing compression molding, transfer molding or autoclave curing techniques. After the process is complete, the bond is fully vulcanized and ready for use in a final application.

One composition that is particularly useful as a one coat adhesive for bonding nitrile rubber to a metal substrate, especially steel, includes a flexibilizer (A), the novolak embodiment of the phenolic resin dispersion (B), an acid (C) and a control agent.

The invention will be described in more detail by way of the following non-limiting examples. The failure mechanism for the tested bond is expressed in terms of percent. A high percent of rubber retained (R) on the metal coupon is desirable since this indicates that the adhesive bond is stronger than-the rubber itself. Rubber-cement failure (RC) indicates the percentage of failure at the interface between the rubber and the adhesive. Cement-metal failure (CM) indicates the percentage of failure at the interface between the metal substrate and the adhesive.

For the boiling water test the bonded test assemblies or coupons were prepared according to ASTM-D-429-B. The leading edge of each of the assemblies was stressed by suspending a two kg weight on the overlapping rubber tail and the assembly was then mounted in a fixture so that the rubber tail was at an approximately 90° angle to the plane formed by the bonded interface. The stressed edge interface was exposed to boiling water by immersing the coupon in boiling water for the indicated time period. After this time, the coupons were removed from the boiling water, allowed to cool and tested on either an Instron mechanical tester by pulling the rubber off the metal at a 45° angle stripping fixture with a crosshead speed of 2 inches per minute or by manually peeling the rubber from the metal substrate. The amount of rubber retained on the bonded area is recorded as a percentage as described above.

For the salt spray test the bonded test assemblies prepared according. to ASTM-D-429-B were buffed on the edges with a grinding wheel. The rubber is then tied back over the metal with stainless steel wire so as to stress the bonded area. This exposes the bond line to the environment. The assemblies then are strung on stainless steel wire and placed in a salt spray chamber. The environment inside the chamber is 100° F., 100 percent relative humidity and 5 percent dissolved salt in the spray, which is dispersed throughout he chamber. The assemblies remain in this environment for the indicated time period. Upon removal, the rubber is peeled manually from the metal substrate. The amount of rubber retained on the bonded area is recorded as a percentage as described above.

EXAMPLES 1–2

Bonding with Autodepositable One Coat Adhesive

A dispersed novolak resin was made by mixing 200 g of resorcinol, 20 g of pyrogallol, 12 g of phosphoric acid (855 aqueous solution) and 220 g of water together and heating to 95° C. When 95° C. was reached, 250 g of formalin (18.5% aqueous solution) was fed to the reaction mixture over a period of 30 minutes. Steam heating was continued for another 15 minutes at which point the mixture was slightly turbid and had a low viscosity (a sample precipitated out of solution upon dilution with water). 16 g of 2-formylbenzenesulfonic acid (sodium salt, 75% moist solid) and 40 more g of formalin then were added. After one hour and 15 minutes of steam heating the resin was very viscous. 200 g of water were added and heating continued for another 15 minutes. Eight more g of formalin were added and heating continued for another 30 minutes. 580 g of water was added to the resin mixture and steam heating was continued until the resin was completely dispersible.

This dispersed resin was mixed into a composition (Example 1) with the following ingredients in wet weight amounts: 37.5 g novolak dispersion; 37.5 g phosphoric acid; 85 g water; 15 g dinitrobenzene sulfonate; and 11.25 g dichlorobutadiene homopolymer latex.

Another dispersed novolak resin was made as described above except that 32 g of the 2-formylbenzenesulfonic acid was used. This dispersed resin was mixed into a composition (Example 2) with the following ingredients in wet weight amounts: 37.5 g novolak dispersion; 37.5 g phosphoric acid; 85 g water; 15 g dinitrobenzene sulfonate; and 11.25 g dichlorobutadiene homopolymer latex.

One set of cold rolled steel coupons was dipped for 10 seconds in a bath of the Example 1 composition and another set of cold rolled steel coupons were dipped for 10 seconds in a bath of the Example 2 composition. The coated coupons were dried at 180° F.

Different peroxide-cured and sulfur-cured nitrile rubber substrates were bonded to the coated steel coupons at by applying heat of 375 to 400° F. for 2 to 3 minutes. Primary adhesion of the resulting assemblies was tested according to ASTM 429 B and the result indicated in Table 1 in units of lb(f)/in. The failure mode for each bonded assembly is also shown in Table 1.

TABLE 1

|  | Example 1 | | Example 2 | |
| --- | --- | --- | --- | --- |
| Nitrile Rubber | Lb | Failure mode | Lb | Failure mode |
| Peroxide-cured-1 | 21 | 5R, 95RC | 22 | 18R, 83RC |
| Peroxide-cured-2 | 43 | 58R, 23RC, 20MT* | 34 | 38R, 63RC |
| Sulfur-cured-1 | 18 | 100RC | 22 | 100RC |
| Sulfur-cured-2 | 35 | 100RC | 32 | 100RC |
| Peroxide-cured-3 | 38 | 40R, 8RC, 50MT | 52 | 65R, 35RC |
| Peroxide-cured-4 | 39 | 20R, 35RC, 45MT | 49 | 100R |
| Peroxide-cured-5 | 5 | 63RC, 38MT | 5 | 100RC |
| Peroxide-cured-6 | 5 | 100RC | 5 | 100RC |

*MT means interlayer failure of the metal treatment coating

EXAMPLE 3

Bonding with Autodepositable Covercoat

A phenolic novolak resin aqueous dispersion was made by mixing together 160 g of sodium salt of 6,7-dihydroxy-2-naphthalenesulfonate, 544 g of a water soluble resole (made from formaldehyde and phenol, F/P ratio of 2.3, 80% solids and commercially available from Schenectady under the trade designation HRJ11722), 200 g of catechol and 200 g of water and steam heating for approximately two hours until the reaction mixture became very viscous and provided a clear dispersion. 880 g of resorcinol and 500 g of water were added followed by 12 g of phosphoric acid in 10 g of water. Steam heating was continued for another 15 minutes. 640 g of formalin (18.5% aqueous solution) then was added while continuing steam heating resulting in a resin concentrate. The concentrate was filtered and self-dispersed upon the addition of 5900 g of water. This novolak dispersion was used to make an autodepositable metal treatment composition by mixing the following ingredients in wet weight amounts: 180 g of the novolak dispersion (20% solids); 180 g phosphoric acid (10% solids); 475 g water; 76 g 2,4-dinitrobenzene sulfonate (5% solids); and 36 g of HYCAR 1578 latex (50% solids).

A phenolic resole resin aqueous dispersion was made by mixing together 40 g of sodium salt of 6,7-dihydroxy-2-naphthalenesulfonate, 250 g of the HRJ11722 resole resin, and 50 g of water and steam heating for approximately 2 hours until the reaction mixture became very viscous and provided a transparent dispersion. 800 g of water was added to the resulting resin concentrate which then self-dispersed and was filtered. This resole dispersion was used to make an autodepositable adhesive covercoat having a solids content of 15% by mixing together the following ingredients in wet weight amounts: 18 g carbon black; 60 g zinc oxide; 75 g mica; 360 g aqueous phenolic resole resin dispersion; 540 g phenolic resole aqueous dispersion that incorporates a non-ionic protective colloid, presumably polyvinyl alcohol, (available from Georgia-Pacific under the trade designation GP 4000); 600 g dichlorobutadiene homopolymer latex; and 2800 g water.

Cold rolled steel coupons were dipped into a bath of the metal treatment composition at room temperature for 15 seconds. After removal from the metal treatment bath, the treated coupons were dried at 180° F. for 3–5 minutes resulting in the formation of an autodeposited film. The treated metal coupons then were dipped for 10 seconds in a bath of the coating/primer. After removal from the coating/primer bath, the coupons were dried at 180° F. for 5–10 minutes. One set of the coupons then was heated for five minutes at 325° F., another set of the coupons was heated for 15 minutes at 320° F. Peroxide-cured nitrile rubber then was bonded to the treated and primed coupons via compression molding at 400° F. for 2 minutes.

The resulting bonded assemblies were tested for primary adhesion by ASTM 429 B. The results for the five minute-baked assemblies was a bonding performance of 100%R and a bond strength of 38 lb(f)/in and for the fifteen minute-baked assemblies was a bonding performance of 100%R and a bond strength of 40 lb(f)/in.

EXAMPLE 4

Bonding with Autodepositable One Coat Adhesive

An autodepositable one coat adhesive was made by mixing together the following ingredients in amounts of dry parts by weight (pbw): 40 pbw dinitrosobenzene; 5 pbw silica (available from Cabot under the tradename CABOSIL); 10 pbw polymaleimide (available from Mitsui Toatsu Fine Chemicals under the tradename BMI-M-20); 1 pbw surfactant (POLYWET 1766); 15 pbw titanium dioxide; and 28 pbw dichlorobutadiene homopolymer to form a masterbatch. Phosphoric acid then was mixed into the masterbatch to reduce the pH to 2. Zinc phosphatized steel coupons then were dipped into the resulting composition. Upon removal of the coupons, a dry film of 0.6 mils uniform thickness was formed indicating successful autodeposition. After drying of the film, natural rubber was bonded to the adhesive-coated coupons for 16 minutes at 320° F. via compression molding. The resulting bonded assemblies then were tested for primary adhesion, 2 hour boiling water test and 200 hour salt spray test with results of 100%R for primary adhesion; 55%R,45%RC for boiling water; and 95%R, 5%RC for salt spray.

Another composition based on the above formulation was made by adding 10 weight percent dispersed phenolic resin after the phosphoric acid. The dispersed phenolic resin was the same as that described in Example 3. Zinc phosphatized steel coupons then were dipped into the resulting composition. Upon removal of the coupons, a dry film of 0.36 mils uniform thickness was formed indicating successful autodeposition. After drying of the film, natural rubber was bonded to the adhesive-coated coupons for 16 minutes at 320° F. via compression molding. The resulting bonded assemblies then were tested for primary adhesion, 2 hour boiling water test and 200 hour salt spray test with results of 100%R for primary adhesion; 100%R for boiling water; and 100%R for salt spray.

We claim:

1. A method for bonding together two substrates, one of said two substrates comprises a surface containing an electrochemically active metal, said method comprising autodepositing an adhesive composition onto said one of said two substrates, wherein the adhesive composition comprises at least one flexibilizer ingredient that destabilizes in the presence of multivalent ions, and an acid providing a pH of 1 to 3 in said adhesive, drying the adhesive, and contacting the other of said two substrates with said adhesive-coated one of said two substrates for sufficient time for bonding said two substrates together.

2. A method according to claim 1 wherein the other of said two substrates is an elastomeric material.

3. A method according to claim 1 further comprising applying a primer or metal treatment to the metallic substrate and then autodepositing the adhesive composition over the primer or metal treatment.

4. A method according to claim 2 wherein an adhesive primer is not applied to the metallic substrate prior to autodepositing the adhesive composition.

5. A method according to claim 1 wherein the flexibilizer comprises a polymer selected from a halogenated polyolefin, an acrylonitrile-butadiene rubber or a styrene-acrylic polymer.

6. A method according to claim 4 wherein the adhesive composition further comprises at least one acid selected from hydrofluoric acid, phosphoric acid, sulfuric acid, hydrochloric acid or nitric acid.

7. A method according to claim 6 wherein the acid comprises phosphoric acid.

8. A method according to claim 1 wherein the adhesive composition further comprises an aqueous phenolic resin dispersion ingredient.

9. A method according to claim 1 wherein the adhesive composition comprises water and is substantially free of volatile organic compounds.

10. A method according to claim 4 wherein the adhesive composition further comprises a control agent ingredient that improves the thickness uniformity of the film formed by the adhesive.

11. A method according to claim 2 comprising dipping the metallic substrate into the adhesive composition to effect autodeposition of the adhesive composition.

12. A method according to claim 11 wherein the dipping is performed at room temperature.

13. A method for bonding a bonding a nitrile rubber substrate to a metallic substrate comprising autodepositing an adhesive composition onto the metallic substrate, wherein the adhesive composition comprises a mixture of at least one flexibilizer ingredient, an aqueous novolak dispersion ingredient, at least one acid ingredient and at least one control agent ingredient that improves the thickness uniformity of the film formed by the adhesive.

14. A method according to claim 13 wherein an adhesive primer is not applied to the metallic substrate prior to autodepositing the adhesive composition.

15. An article of manufacture comprising a metallic substrate adhesively bonded to a metallic substrate wherein the substrates were bonded by the method of claim 1.

16. A method according to claim 3 wherein the adhesive composition further comprises at least one crosslinker selected from an aromatic nitroso compound or aromatic nitroso compound precursor.

17. A method according to claim 16 wherein the adhesive further comprises an aqueous phenolic resin dispersion.

18. A method according to claim 6 wherein the adhesive further comprises at least one control agent selected from a nitro compound, a nitroso compound, an oxime compound or a nitrate compound.

19. A method according to claim 6 wherein the adhesive composition further comprises at least one crosslinker selected from an aromatic nitroso compound or aromatic nitroso compound precursor.

20. A method according to claim 18 wherein the adhesive further comprises an aqueous phenolic resin dispersion.

21. A method according to claim 19 wherein the adhesive further comprises an aqueous phenolic resin dispersion.

* * * * *